Oct. 24, 1967     M. BÖHM     3,349,399
BEACON SYSTEM FOR SIMULTANEOUS AZIMUTH
AND ELEVATION DETERMINATION
Filed Feb. 23, 1966     4 Sheets-Sheet 1

INVENTOR
MANFRED BÖHM

BY *Philip M Belton*

ATTORNEY

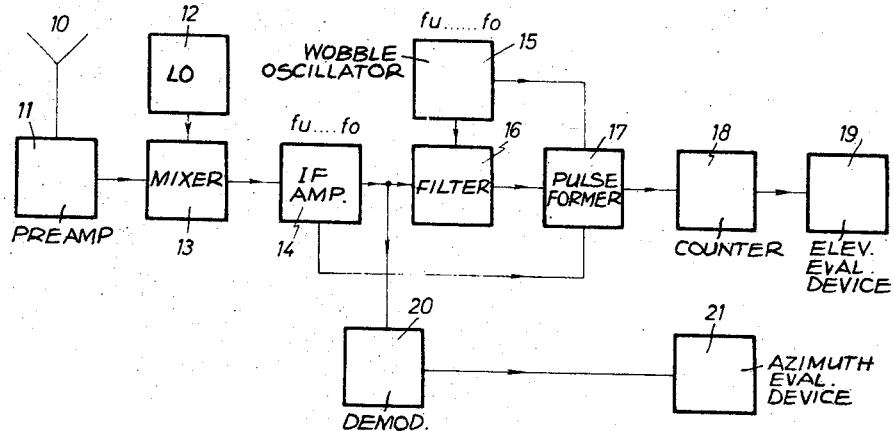
Fig. 4
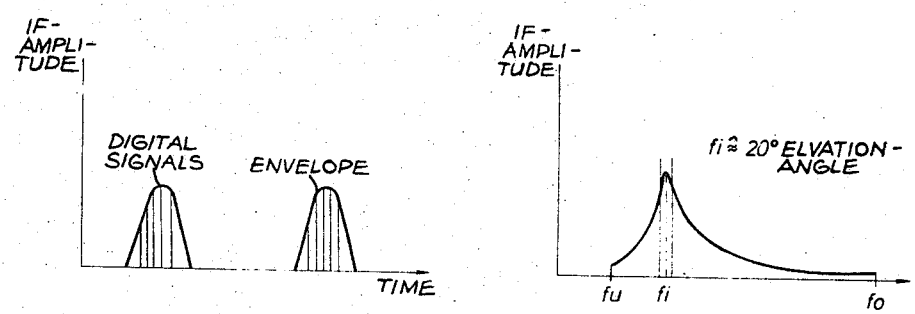
Fig. 5
Fig. 6

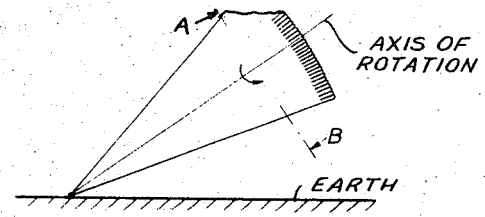
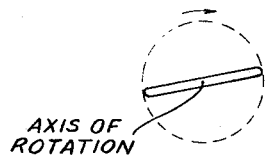
Fig. 11     Fig. 11a
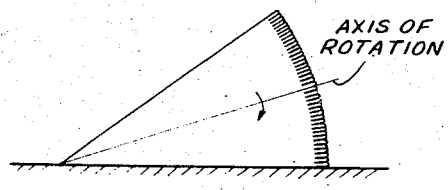
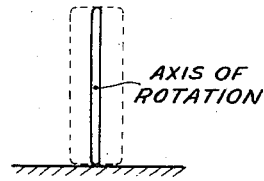
Fig. 12     Fig. 12a
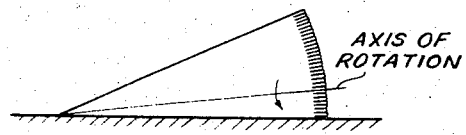
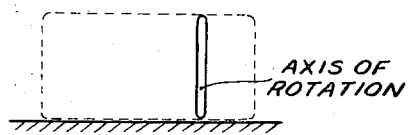
Fig. 13     Fig. 13a
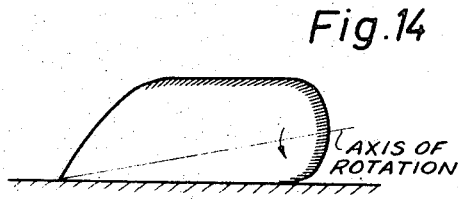
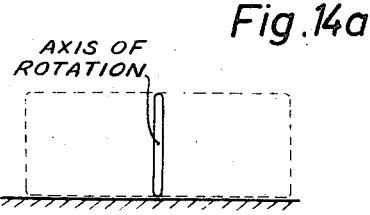
Fig. 14     Fig. 14a United States Patent Office 3,349,399
Patented Oct. 24, 1967

3,349,399
BEACON SYSTEM FOR SIMULTANEOUS AZIMUTH
AND ELEVATION DETERMINATION
Manfred Böhm, Bietigheim, Germany, assignor to International Standard Electric Corporation, New York, N.Y., a corporation of Delaware
Filed Feb. 23, 1966, Ser. No. 529,461
Claims priority, application Germany, Mar. 18, 1965,
St 23,536, St 23,537
13 Claims. (Cl. 343—106)

ABSTRACT OF THE DISCLOSURE

A radio navigation system wherein a plurality of different frequency pencil beams are simultaneously transmitted for elevation angle determination, the pencil beams being further coded to provide azimuth angle information. Means are provided at a receiver for simultaneously determining azimuth and elevation angles from the coded pencil beams.

This invention relates to a radio navigation system and more particularly to a beacon for radiating a pattern from which an aircraft pilot can determine elevation and azimuth angle.

In aircraft radio navigation it is desirable for certain purposes, e.g. for vertical take-off and landing aircraft (VTOL aircraft), to determine in an aircraft the elevation angle thereof with reference to a radio beacon as well as the azimuth angle.

Accordingly, it is an object of the present invention to provide a beacon system from which an aircraft can determine elevation and azimuthal angles.

In the invention disclosed hereinafter, the principles of rotating fan diagrams are used.

It is also required for some tasks to vary the range of a pilot beam transmitter and consequently the shape of the beam diagram of a pilot beam or a radar equipment in a wide range as desired, e.g. depending on the location (e.g. in the mountains or in the plains) and/or depending from the position of the rotating and swivelling axis, respectively.

Another object of this invention is to provide a fan diagram, variable in its beam angle and in its shape within wide limits, preferably in the centimeter or millimeter wave range.

The above-mentiond objects of this invention will become more apparent by reference to the following description taken in conjunction with the accompanying drawings, in which:

FIGURE 4 is a block diagram of a receiver for determining elevation and azimuthal angles;

FIGURES 5 and 6 illustrate graphically the principle of the invention;

Figure 3:
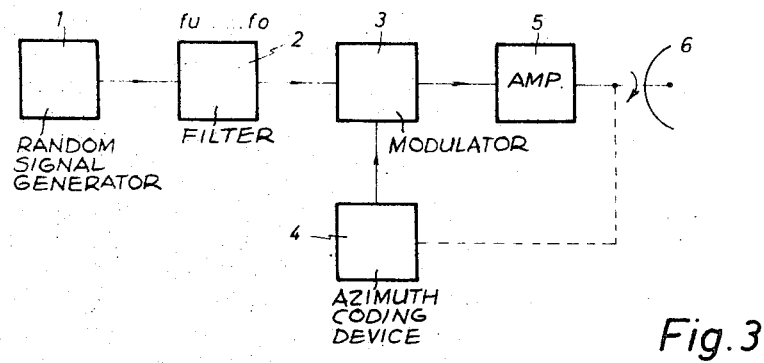
FIGURE 3 is a block diagram of a transmitter for radiating the diagrams of FIGURES 1 and 2.
Figure 10:
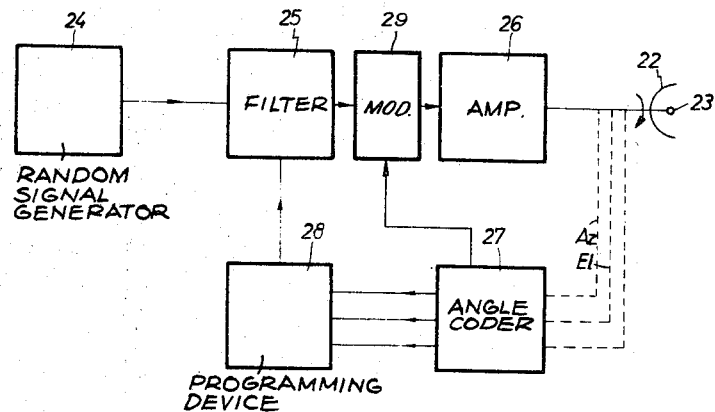
FIGURE 10 is a block diagram of a second embodiment of the invention.

FIGURES 11 through 14 and 11a through 14a illustrate a plurality of fan diagrams obtained from the transmitters of FIGURES 3 and 10.

Figure 1:
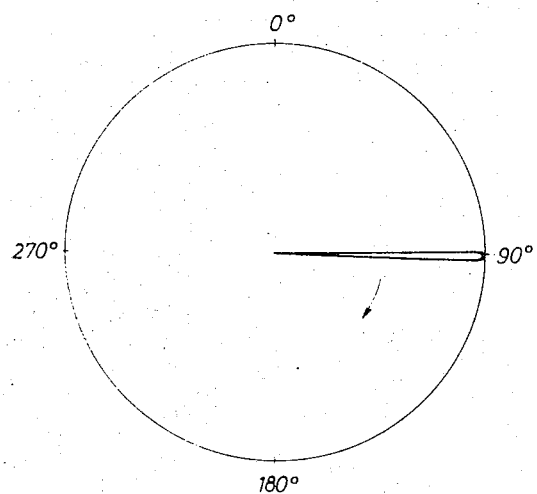
FIGURE 1 illustrates a rotating fan diagram in the azimuth plane.
Figure 2:
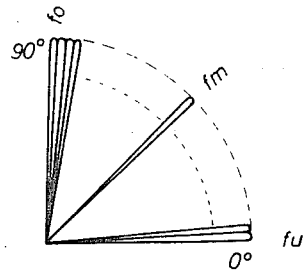
FIGURE 2 illustrates a rotating fan diagram in the elevation plane.

The radiated diagram sharply focused in the azimuth plane (FIG. 1), which extends in the elevation plane approximately from 0° to 90° (FIG. 2), is modulated by a digital signal in a way known to the art, which marks the respective direction of radiation, said digital signal being derived from the position of the antenna.

The antenna is caused to rotate around the vertical axis with a predetermined uniform speed, i.e. with a rotating frequency of some cycles per second, for example. It is suitable to operate in the centimeter wave range (X-band or K-band), in order to keep the dimensions of the antenna small on one hand and to obtain, on the other hand, a very sharp focusing.

An aircraft in the radiation range of the radio beacon is hit at each antenna rotation for a short time by the beam. The received signal is demodulated and decoded by means of a suitable receiver in the aircraft whereby the azimuth is determined aboard the aircraft.

The determination of azimuth by means of a fan diagram in the above-described manner is known to the art. It is also known to determine, in a similar way, the elevation angle by a second fan diagram, rotating around a horizontal axis.

In order to determine with the fan diagram azimuth and elevation angle simultaneously, the fan diagram is composed of a plurality of pencil diagrams. The rotation of a pencil beam with electronic means is known from the radar technique. In prior art directional antenna systems a plurality of radiating elements are successively fed with cyclically variable frequencies. In this technique only a single pencil beam at a time is emitted, or the individual pencil beams are emitted sequentially in a timely succession.

If it is intended to produce simultaneously all pencil beams in order to obtain a constantly existing fan diagram, it would be necessary following the conventional technique, to use as many transmitters of different frequency or phase respectively, as pencil beams are desired. If the entire elevation angle range between 0° and 90° should be discriminated to an accuracy of 1°, 90 transmitters of different frequencies have to be used.

In order to avoid this, according to the invention the required frequency spectrum is produced with the aid of a wide-band random signal generator followed by a filter. The output of the filter 25 is fed to a modulator 29, the output of which is then fed to an amplifier 26 to amplify said frequency spectral to the desired level. Coupled to the output of amplifier 25 is a directional antenna system, known per se, having a plurality of slot radiators in element 23 and a reflector 22. Prior to radiation the frequency spectrum is pulse-modulated in the modulator 29, depending on the respective antenna position for transmission of the azimuth data.

The elevation angle aboard an aircraft is measured by searching the proper predetermined frequency range "looking" for the frequency having the maximum amplitude (see FIG. 6). This is achieved by coupling the intermediate frequency amplifier of the airborne receiver to a very narrow bandpass filter, variable with respect to its center frequency, and the output amplitude is measured in a way known per se. The principle of angle evaluation is represented in FIGS. 5 and 6 and a functional block diagram of the receiving device is shown in FIG. 4.

The transmitting device is schematically shown in FIG. 3. A random signal generator 1, operating with a wideband in the range of the transmitting frequencies and a succeeding filter 2 furnish a frequency spectrum, containing all desired frequencies $f_u$ to $f_o$. These frequencies furnish, to a first approximation, with a suitable antenna 6, the radiation diagram shown in FIGS. 1 and 2. An azimuth coding device 4 (FIG. 3), e.g. a code disc, is coupled to the antenna rotation axis 6, as indicated by the dotted line. The output voltage of the azimuth coder 4 is fed to one input of a modulator 3 and the frequency mixture, taken at the output of filter 2, is fed to the second input of modulator 3. The modulated frequency mixture at the output of modulator 3 is amplified by means of a power amplifier stage 5 and radiated by antenna 6. A receiver according to the invention is shown in FIG. 4 comprising the receiving antenna 10, a wide-band superheterodyne receiver with preamplifier stages 11, local oscillator 12, mixing stage 13 and IF-amplifier 14. The evaluation device following the IF-amplifier 14 is divided into two channels, of which the first contains a wide-band demodulator 20 for azimuth evaluation in a conventional way, and the actual azimuth evaluation device 21 which includes the indicator.

In the second channel, serving to determine the elevation angle, a very narrow bandpass filter is contained, the center frequency of which is periodically varied across the entire frequency range $f_u$ to $f_o$. This variation can be made in a way known per se, either mechanically or electronically. FIG. 4 shows an electronic variation of the type of a phase following control with the aid of a wobble oscillator 15. At the coincidence of a frequency spectral line arriving from the IF-amplifier 14 having maximum amplitude with a frequency arriving from the wobble oscillator 15, a voltage maximum occurs at the output of filter 16 (FIG. 6). This maximum is converted into a needle-type impulse by means of a pulse former 17 ($f_1$, FIG. 6). At the lower end of the frequency range ($f_u$) (or at the upper end, or at both ends, depending on the mode of operation desired) wobble generator 15 releases via pulse shaper 17, which is controlled by a control voltage, derived from IF-amplifier 14, a start pulse for a counter 18. Further pulses at suitable distances are produced when varying the frequency of wobble oscillator 15. At the voltage maximum occurring at coincidence of maximum spectral line and wobbling frequency at the output of the tunable filter 16, a stop pulse is fed to counter 18. The result of counter 18 is prepared for readout in the elevation evaluation device 19.

If a visual display evaluation is sufficient, the output voltage of filter 16 is fed to the input of the $y$ co-ordinate amplifier of a cathode ray oscilloscope, while the $x$ deflection is controlled by wobble oscillator 15, depending on the frequency. The $x$ axis can be calibrated directly in degrees.

Another kind of elevation evaluation means known to the art, is the use of a mixed and a tuned filter. The wobbling oscillator is then followed by a discriminator. If at the output of the filter a pulse of maximum amplitude occurs, the voltage at the output of the discriminator at this moment represents a measure of the elevation angle. This type of evaluation means is well known in the art and is not illustrated herein.

Figure 7:
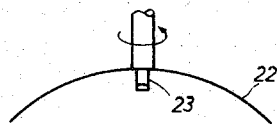
FIGURES 7, 8 and 9 illustrate one embodiment of an antenna for use in transmitters according to this invention.
Figure 8:
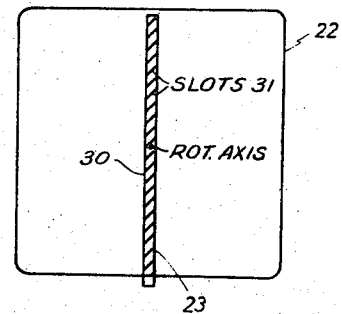
Figure 9:
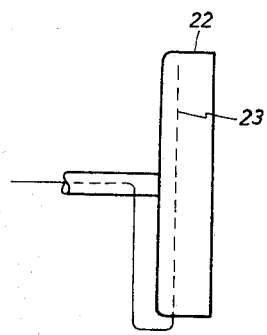

The directional antenna system 6, known from the radar technique in similar designs, is outlined in FIGS. 7, 8 and 9. It consists of a cylindrical parabolic reflector 22 and a primary radiator 23 arranged in its focusing line which provides a sharp focusing of the energy. The primary radiator 23 is, for example, a wave guide 30 having a plurality of slot radiators 31 in one of its walls.

The directional antenna system rotates around an axis perpendicular to the aperture of the reflector.

A second embodiment of a transmitter according to this invention is illustrated in FIG. 10. This embodiment performs the same basic functions as that of FIG. 3, but additionally provides the capability of modifying the shape of the radiation pattern. This enables the tailoring of the radiated pattern in accordance with various terrain and other external conditions. For feeding the antenna system, a random signal generator 24, with a succeeding filter unit 25, is used, the output voltage of which is fed to a modulator 29. Modulator 29 is coupled to the angle coder 27 and is further coupled to the power amplifier stage 26. The random signal generator 24 produces a wide frequency range of a constant spectral power distribution and the filter unit 25 serves to determine the limits of the frequency band desired; thereby the beam angle and/ or the shape of the fan diagram, is determined in conjunction with the antenna system, the fan diagram is in the plane, perpendicular to the aperture and passing through the axis of the reflector, sharply beamed, but shows within said plane such a beam angle as determined by the width of the frequency band and the focusing properties of the primary radiator 23, together with the reflector 22. The portion of this system comprising the modulator 29 coupled to angle coder 27 operates in a similar manner as the corresponding elements 3 and 4, respectively, of FIG. 3.

The technique herein described is based on the application of an electronic diagram swivelling by means of frequency variation; that is, the frequencies feeding the antenna system are not fed sequentially, but all frequencies are simultaneously fed to the antenna system. In this manner all individual pencil beams, otherwise sequentially produced by the individual sequential transmission of the frequencies, are emitted simultaneously, thus forming the fan diagram. The thus produced fan diagram rotates due to the provided rotation of the antenna system around an axis located in the fan plane. The angular discrimination of the rotation axis can be determined at a target, e.g. an aircraft, hit by the pilot beam, in a way known per se, by decoding the signal radiated from ground.

The one object of the invention is, as already indicated, that the diagram, radiated by the antenna system, can be carried within wide ranges without any mechanical change of the antenna system itself, in that the feeder energy for the antenna system, with regard to the width of the frequency band and with regard to the spectrum power distribution, is modified either by a filter unit 25 having a variable bandwidth or by means of several tuned filters.

The modification can, in principle, be obtained in dependence of the following variables, namely as function of:

(1) the angle of the rotation axis of the antenna system, (2) the elevation angle of the rotating axis of the antenna system, (3) the azimuth of the rotating axis of the antenna system.

Referring to FIG. 10, the filter unit 25 can be designed thus that its frequency bandpass is influenced, depending on one or several of the three above-mentioned criteria.

The FIGS. 11 to 14 and 11A to 14A respectively, are possible diagram shapes in lateral view and in top view respectively (seen from the front onto the rotation axis). Note that these diagrams are only attainable with the system illustrated in FIG. 10, although the system of FIG. 3 could be suitably modified by one ordinarily skilled in the art in accordance with the principles disclosed herein to provide similar results.

FIG. 11 shows a still uninfluenced diagram which is produced that the frequency band, produced by the random signal generator 3 (FIG. 10), is limited, symmetrical to the center frequency by means of the filter unit 25, FIG. 10, to a measure corresponding to the desired beam angle of the fan diagram. A uniform spectral power distribution is thereby maintained. The solid line in FIGURE 11a represents the actual radiated pattern and the dashed lines the limits within which the radiated pattern may be varied. This type of pattern is achieved by providing means for rotating the antenna about its own axis as well as about the vertical axis.

FIGS. 12 and 13 show diagrams which are obtained by a symmetrical or asymmetrical cutting off, respectively, of the frequency band as a function of the rotation angle.

FIG. 14 represents a diagram which is obtained by asymmetrical cutting off of the frequency band and under the influence of the attenuation curve, depending on the rotation angle.

In the same way random diagram shapes can be obtained in dependence of the elevation angle and/or in dependence of the azimuth of the rotation axis.

This can be obtained, for example, by means of corresponding signal generators coupled to the antenna rotation axis, which are provided for rotation angle, elevation and azimuth, which control, by means of angle coder 27, a programming device 28, the output voltage of which influences filter unit 25 in the sense of a corresponding cutting off of the frequency band.

As already indicated, filter 25 may consist of a single filter variable in its parameters, attenuation and bandwidth, or of a plurality of individual filters with fixed, but different parameters. The frequency band, furnished by the random signal generator 24, is then cut off by variation of the parameters of the variable filter or by selective switching of the input onto the different filters. This process is controlled by programming device 28 into which are fed the independent variables, rotation angle of the reflector, elevation angle and azimuth. The programming device may contain a number of predetermined programs, so that a corresponding number of shapes of radiation diagrams are produced.

While I have described above the principles of my invention in connection with specific apparatus, it is to be clearly understood that the specification is presented by way of example and not as a limitation of the scope of my invention, as set forth in the accompanying claims.

I claim:

1. A navigation system for simultaneously determining on board an aircraft the elevation angle and azimuth angle of said aircraft with respect to a transmitting station, comprising:
a transmitting station including:
means for radiating electromagnetic energy in a fan diagram pattern, said radiating means including means for simultaneously radiating a plurality of pencil beams within said fan diagram, each said pencil beam having a different frequency characteristic; and
means for rotating said fan diagram radiation pattern; and
a receiver on board said aircraft, said receiver including:
means for receiving said fan diagram;
means for detecting which of said plurality of pencil beams is received with maximum amplitude; and
means coupled to said detecting means for determining the elevation angle of said aircraft with respect to said transmitting station.

2. A system as in claim 1 wherein said transmitting station includes means producing azimuth code signals and means for modulating said rotating fan diagram with said azimuth code signals.

3. A system as in claim 1 wherein said means for radiating a rotating fan diagram includes a random signal generator, a filter coupled to said random signal generator for limiting the pass-band thereof, a directional antenna system coupled to said filter and means for rotating said directional antenna system.

4. A system as in claim 3 further including a modulator coupled between said filter and said directional antenna system and an azimuth coding device coupled to said modulator for modulating said rotating fan diagram to radiate azimuth information.

5. A system as in claim 3 further including means for changing the shape of said fan diagram, said changing means including means for varying a parameter(s) of said filter.

6. A system as in claim 5 wherein said filter parameter varying means is coupled to said antenna.

7. A system as in claim 5 wherein said varied parameter is the frequency bandpass of said filter.

8. A system as in claim 5 wherein said varied parameter is the attenuation characteristic of said filter.

9. A system as in claim 3 wherein said directional antenna system includes a waveguide having a plurality of slot radiators in one of the walls of said waveguide.

10. A system as in claim 1 wherein the receiver on board the aircraft includes an IF amplifier, a variable narrow band-pass filter coupled to said IF amplifier and means to measure and indicate the output voltage from said filter.

11. A navigation system for simultaneously transmitting elevation angle and azimuth angle information to an aircraft with respect to a transmitting station, comprising at said transmitting station:
means for radiating electromagnetic energy in a fan diagram pattern, said radiating means including means for simultaneously radiating a plurality of pencil beams within said fan diagram, each said pencil beam having a different frequency characteristic;
means coupled to said radiating means for rotating said fan diagram radiation pattern; and
means coupled to said radiating means for coding said rotating fan diagram to provide azimuth angle information.

12. A system as in claim 11 wherein said means for radiating said fan diagram includes:
a random signal generator;
a filter coupled to said random signal generator for limiting the pass-band thereof; and
a directional antenna system coupled to said filter.

13. A system as in claim 12 further including means for changing the shape of said fan diagram, said changing means including means for varying a parameter(s) of said filter.

References Cited

UNITED STATES PATENTS

| | | | |
|---|---|---|---|
| 2,422,691 | 6/1947 | Mason | 343—102 |
| 2,524,758 | 10/1950 | Browder | 343—11 |
| 3,119,998 | 1/1964 | Foley | 343—106 |
| 3,197,774 | 7/1965 | Goldbohm | 343—102 |

RODNEY D. BENNETT, *Primary Examiner.*

CHESTER L. JUSTUS, *Examiner.*

H. C. WAMSLEY, *Assistant Examiner.*